United States Patent [19]  
Nakamura et al.

[11] Patent Number: 4,800,773
[45] Date of Patent: Jan. 31, 1989

[54] ACCELERATOR CABLE CONNECTING DEVICE

[75] Inventors: Akira Nakamura, Zama; Motoyoshi Hanaoka, Yokohama; Tatsuo Sugimoto, Chiba, all of Japan

[73] Assignee: Nissan Motor Co., Ltd., Japan

[21] Appl. No.: 907,867

[22] Filed: Sep. 16, 1986

[30] Foreign Application Priority Data

Sep. 20, 1985 [JP] Japan ................................. 60-144564
Oct. 30, 1985 [JP] Japan ................................. 60-168368

[51] Int. Cl.⁴ .............................................. F16C 1/10
[52] U.S. Cl. .................................... 74/500.5; 74/502.6; 74/512; 74/560
[58] Field of Search ............... 74/512, 513, 501.5, 74/560, 502.6, 501.6, 500.5, 502.2, 502.4, 551.9; 188/2 D, 196 R; 192/111 A; 403/291, 220, 224; 24/128; 180/335

[56] References Cited

U.S. PATENT DOCUMENTS

| 421,936 | 2/1890 | Horton et al. | 74/551.9 |
| 3,400,605 | 9/1968 | Hood | 74/501 B |
| 3,730,318 | 5/1973 | Camp | 74/512 X |
| 3,741,033 | 6/1973 | Wilke et al. | 74/512 |
| 4,263,998 | 4/1981 | Moriya | 74/501 R |
| 4,546,666 | 10/1985 | Secord | 74/501 R |

FOREIGN PATENT DOCUMENTS

| 0067099 | 12/1982 | European Pat. Off. . | |
| 2237301 | 3/1973 | Fed. Rep. of Germany | 74/513 |
| 50-128824 | 10/1975 | Japan . | |
| 56-44930 | 4/1981 | Japan . | |
| 60-252029 | 12/1985 | Japan | 180/335 |
| 223865 | 6/1924 | United Kingdom . | |
| 550138 | 12/1942 | United Kingdom | 74/560 |
| 2013816 | 8/1979 | United Kingdom . | |
| 2060808 | 5/1981 | United Kingdom . | |

Primary Examiner—Gary L. Smith
Assistant Examiner—Rodney M. Lindsey
Attorney, Agent, or Firm—Leydig, Voit & Mayer

[57] ABSTRACT

An accelerator cable arrangement through which an accelerator pedal and an engine carburetor are mechanically connected. The accelerator cable arrangement is composed of a cylindrical housing which is securely connected at its one end section with a pedal lever carrying the accelerator pedal. An accelerator cable passes through an opening formed in the housing end section and is securely connected to an engaging member which is movably disposed inside the cylindrical housing and elastically supported to the inner wall surface of the cylindrical housing, thereby preventing the engaging member from projecting backward and hanging down.

15 Claims, 4 Drawing Sheets

ACCELERATOR CABLE CONNECTING DEVICE

BACKGROUND OF THE INVENTION

1. Field of the Invention

The present invention relates generally to an accelerator cable arrangement for operatively connecting an accelerator pedal with an engine or the like, and more particularly to such an accelerator cable arrangement adapted to effectively damp vibration transmitted thereto.

2. Description of the Prior Art

In connection with a vehicular accelerator arrangement in which a depression force of an accelerator pedal is transmitted through an accelerator cable to a carburetor located remote from the accelerator pedal, a proposal has been made to avoid discomfort caused by vibration transmitted through the accelerator cable from an engine or the like, as disclosed, for example, in Japanese Utility Model Provisional (First) Publication No. 56-44930. In this proposal, vibration insulating rubber is used in a connecting section of the accelerator cable and a pedal lever carrying an accelerator pedal. More specifically, the insulating rubber is interposed between the pedal lever and a metallic stop member secured at the extreme end of the accelerator cable, in which the accelerator cable passes through the pedal lever and the insulating rubber. The metallic stop member functions to prevent the pedal lever and the insulating rubber from coming off the accelerator cable.

With such an accelerator arrangement, if the elasticity of the insulating rubber is too high, the insulating rubber highly deflects upon depression of the accelerator pedal, thus unnecessarily increasing depression stroke of the accelerator pedal. On the other hand, if the elasticity of the insulating rubber is too low, a desired vibration damping effect cannot be obtained. Additionally, since the metallic stop member also serving as a mass member is not supported relative to the pedal lever so as to be free, it will unavoidably project backwardly under inertia and hangs down by its own weight when the accelerator pedal is depressed. This causes local contact of the insulating rubber with adjacent members resulting in eccentric wear of the insulating rubber, thus significantly lowering vibration damping effect of the insulating rubber. The above-mentioned hanging-down of the metallic stop member or mass member unnecessarily pulls the accelerator cable, so that rapid engine speed rise due to engine racing tends to occur.

SUMMARY OF THE INVENTION

An accelerator cable arrangement of the present invention comprises a cylindrical housing securely connected at its first end section to a pedal lever carrying an acceleration pedal. The cylindrical housing is movable together with the accelerator pedal in a direction upon depression of the accelerator pedal. A supporting and damping structure is movably disposed inside the housing and elastically supported relative to the housing by an elastic section. An accelerator cable for providing mechanical connection between the pedal lever and an engine passes through the housing first end section and is connected at its first end section with the supporting and damping structure.

Thus, the supporting and damping structure is disposed inside the cylindrical housing and, therefore, is prevented from projecting backward and hanging down, thereby avoiding local contact with adjacent members. This protects the elastic section of the supporting and damping structure from eccentric wear, thereby always maintaining a high vibration damping effect of the elastic section of the supporting and damping structure while preventing rapid engine speed rise due to engine racing caused by the accelerator cable being unnecessarily pulled.

BRIEF DESCRIPTION OF THE DRAWINGS

In the following drawings, like reference numerals designated corresponding elements and parts.

DETAILED DESCRIPTION OF INVENTION

Figure 1:
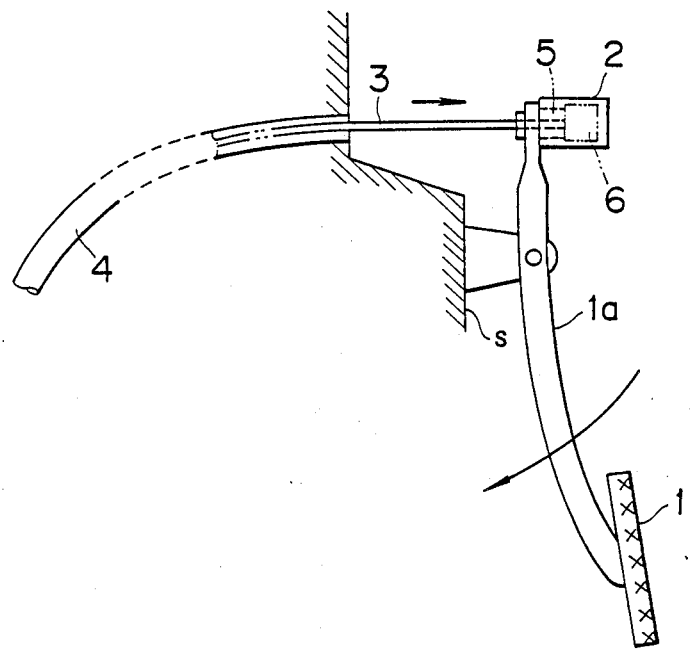
FIG. 1 is a schematic illustration showing a connection between an accelerator cable and an accelerator pedal, with a first embodiment of an accelerator cable arrangement in accordance with the present invention.
Figure 2:
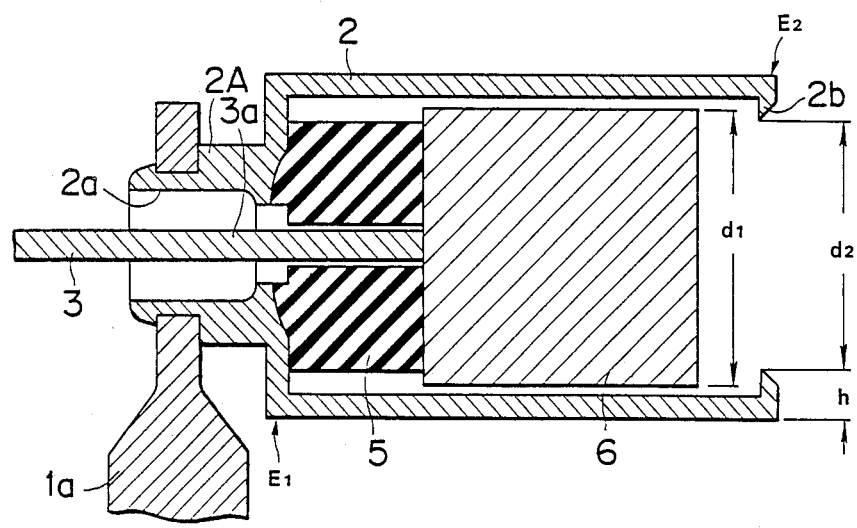
FIG. 2 is a vertical sectional view of an essential part of the first embodiment accelerator cable arrangement of FIG. 1.

Referring now to FIGS. 1 and 2, there is shown a first embodiment of an accelerator cable arrangement in accordance with the present invention. The accelerator cable arrangement comprises a cylindrical housing 2 which is rigidly connected at its one end section $E_1$ to the upper end section of a pedal lever $1a$ with the axis of the housing 2 perpendicular to the lever $1a$. The pedal lever $1a$ carries at its lower end section an accelerator pedal 1 and is pivotally supported by a vehicle body S of an automotive vehicle as shown in FIG. 1. More specifically, the cylindrical housing 2 is integrally formed at its one end section with a cylindrical projection 2A which securely fits with the upper end section of the pedal lever $1a$. Passing through a through-hole $2a$ of the cylindrical projection 2A is an end section $3a$ of an accelerator cable or inner cable 3 the other end section of which is connected to a carburetor of an internal combustion engine though not shown. The accelerator cable 3 constitutes with an outer tube 4 an accelerator cable assembly (no numeral) as illustrated in FIG. 1. According to the invention, the extreme end of the accelerator cable end section $3a$ is connected to be moved in response to movement of the pedal by a damping and supporting structure having a metallic engaging or weight section 6 movably disposed inside the housing 2, so that the accelerator cable can be prevented from comming out of the housing 2. The engaging section 6 preferably has a weight not less than 40 g.

As shown, in carrying out the invention the supporting and damping structure has an elastic section 5 of vibration insulating rubber 5 interposed between the engaging section 6 and the inner surface of the end section of the housing 2. The vibration insulating rubber section 5 is formed with a through-hole through which the accelerator cable end section 3a passes. Thus, the vibration insulating rubber section 5 is biased against the inner surface of the housing 2 by the engaging member 6 under pulling force applied through the acceleration cable 3 to the engaging section 6. The engaging section 6 has a sufficient mass to effectively damp vibration transmitted from the side of the engine through the acceleration cable 3 to the insulating rubber section 5 so that the engaging section 6 functions as a damper.

In this embodiment, the engaging section 6 and the housing 2 have a circular cross-section, in which the diameter of the engaging section 6 is slightly smaller than the inner diameter of the housing 2 so that the engaging member 6 is movable within the housing 2 with a slight play. Accordingly, when the acceleration pedal 1 is depressed as shown in FIG. 1 to rotate the lever 1a in the direction of an arrow, the engaging section 6 slightly displaces within the housing 2, compressing the insulating rubber section 5 under pulling reaction of the accelerator cable 3. The other end section $E_2$ of the housing 2 is formed with an annular flange 2b which defines at its inner periphery an opening (no numeral). The annular flange 2b is formed by bending the end edge of the housing end section $E_2$ inwardly in a manner to have such a radial bent length h that the engaging section 6 is prevented from coming out of the housing 2 upon striking against the annular flange 2b. In other words, it is sufficient that the inner diameter $d_2$ of the annular flange 2b is smaller than the diameter $d_1$ of the engaging section 6.

With the thus configurated accelerator cable arrangement, even the moment the housing 2 moves leftward in FIG. 2 upon release of the accelerator pedal 1, the engaging section 6 is supported by the inner cylindrical surface of the housing 2 and therefore prevented from coming out of the housing 2 and hanging down by its own weight. This effect of preventing coming-out and hanging-down of the engaging member 6 is further improved by the annular flange 2b. Accordingly, the insulating rubber section 5 is prevented from local contact with the engaging section 6, thereby avoiding eccentric wear of the insulating rubber section 5. This maintains a high vibration insulating effect of the insulating rubber section 5 interposed between the engaging section 6 and the housing inner wall, thus always effectively damping vibration transmitted from the engine side.

Figure 3:
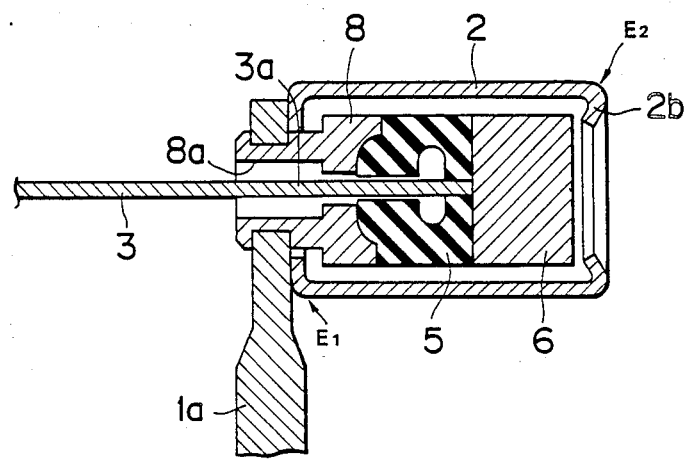
FIG. 3 is a vertical sectional view similar to FIG. 2 but showing an essential part of a second embodiment of the accelerator cable arrangement.

FIG. 3 illustrates a second embodiment of the acceleration cable arrangement according to the present invention, similar to the first embodiment with the exception that the housing 2 is rigidly connected through a guide member 8 with the upper end section of the pedal lever 1a for the accelerator pedal 1. More specifically, the guide member 8 is formed separate from the housing 2 and inserted into the inside of the housing 2 through an opening (no numeral) formed through the end wall of the housing 2. The guide member 8 securely fits at its section projected outside the housing 2 with the upper end section of the pedal lever 1a, and formed therethrough a through-hole 8a through which the accelerator cable 3 passes. As shown, the vibration insulating rubber section 5 of the supporting and damping structure is interposed between the guide section 8 and the engaging section 6. Also in this embodiment, the engaging section 6 is prevented from coming out of the housing 2.

Figure 4:
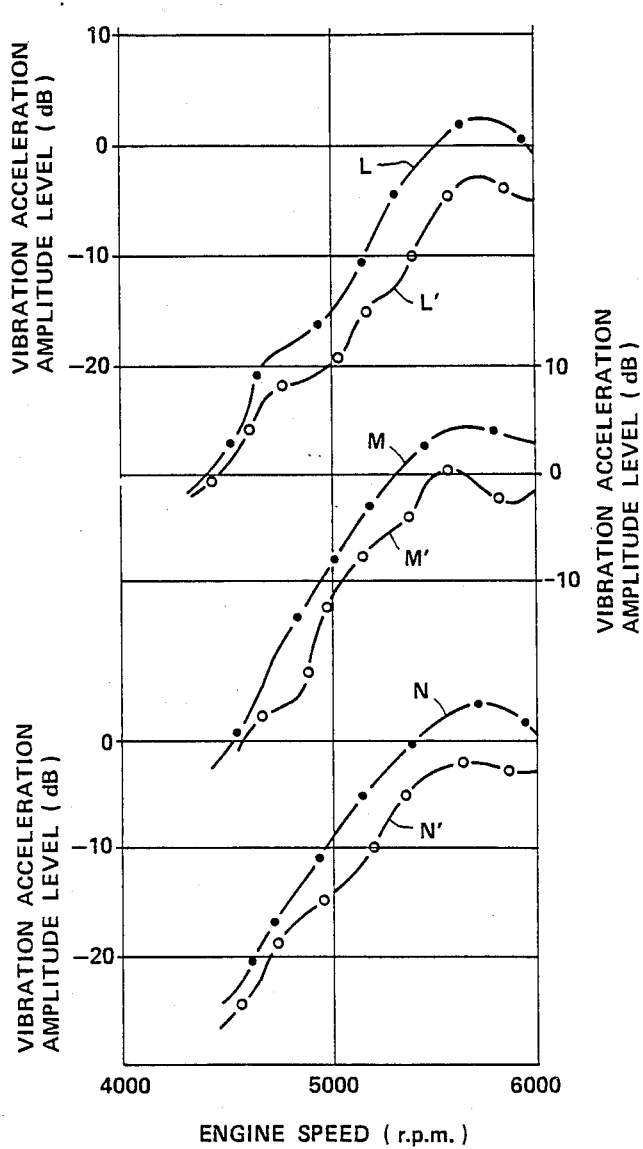
FIG. 4 is a graph showing comparison in vibration damping effect between the second embodiment accelerator cable arrangement of the present invention and a conventional corresponding accelerator cable arrangement.

FIG. 4 shows comparison in vibration acceleration amplitude level (dB) between the accelerator cable arrangement of FIG. 3 and the conventional corresponding arrangement as disclosed in Japanese Utility Model Provisional Publication No. 56-44930. A curve L represents vibration of the accelerator pedal 1 in cooperation with the accelerator cable arrangement of FIG. 3, while a curve L' represents vibration of an accelerator pedal in cooperation with the conventional accelerator cable arrangement. A curve M presents vibration in the accelerator cable axial direction of the pedal lever (1a), while a curve M' represents the corresponding vibration of the conventional accelerator cable arrangement. A curve N represents vibration in the accelerator cable axial direction of an accelerator cable arrangement including the insulating rubber section 5 and the engaging section 6 of FIG. 3, while a curve N' represents the corresponding vibration of the conventional accelerator cable arrangement. These curves reveal that the accelerator cable arrangement of the present invention is superior in vibration damping effect as compared with the conventional accelerator cable arrangement.

Figure 5:
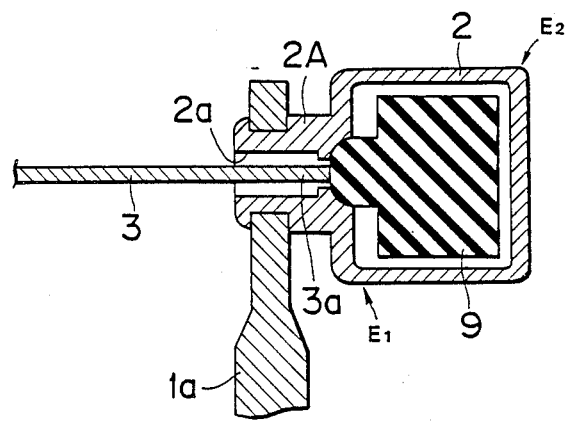
FIG. 5 is a vertical sectional view similar to FIG. 2 but showing an essential part of a third embodiment of the accelerator cable arrangement in accordance with the present invention.

FIG. 5 illustrates a third embodiment of the accelerator cable arrangement in accordance with the present invention, similar to the first embodiment of FIGS. 1 and 2 with the exception that the supporting and damping structure 9 is entirely made of rubber in place of the separate insulating rubber section 5 and the engaging section 6. In this embodiment, the supporting and damping structure member 9 has a vibration damping function and also serves as a mass member having a weight not less than 40 g. As shown, the accelerator cable 3 passes through the through-hole 2a of the end section $E_1$ of the housing 2 and is securely connected to the insulating rubber member 9 so that the insulating rubber member 9 is biased to the inner wall of the housing 2. Additionally, the other end section of the housing 2 is completely closed to form a confined space in which the member 9 is disposed.

Figure 6A:
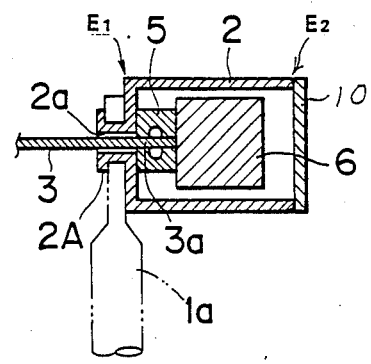
FIG. 6A is a vertical sectional view similar to FIG. 2 but showing an essential part of a fourth embodiment of the accelerator cable arrangement in accordance with the present invention.
Figure 6B:
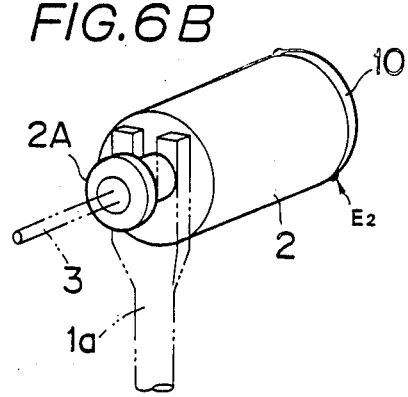
FIG. 6B is a perspective view of the essential part of the accelerator cable arrangement of FIG. 6A.

FIGS. 6A and 6B illustrate a fourth embodiment of the accelerator cable arrangement according to the present invention, which is similar to the first embodiment of FIG. 2 with the exception that the end section $E_2$ of the housing 2 is closed by a lid member 10 which is made of metal and welded to the open extreme end of the end section $E_2$ of the housing 2. In this embodiment, the engaging section 6 is strikable against the inner surface of the lid member 10 upon rightward relative movement in FIG. 6A.

Figure 7:
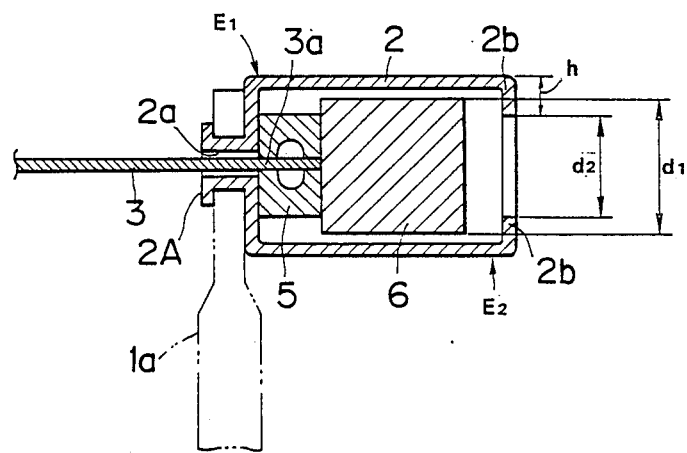
FIG. 7 is a vertical sectional view similar to FIG. 2 but showing an essential part of a fifth embodiment of the accelerator cable arrangement in accordance with the present invention.

FIG. 7 illustrates a fifth embodiment of the accelerator cable arangement in accordance with the present invention, which is similar to the fourth embodiment of FIGS. 6A and 6B with the exception that the housing 2 is formed at the end section $E_2$ with the annular flange 2b in place of the lid member 10. The annular flange 2b is formed by bending the end edge portion of the end section $E_2$ of the housing 2. As shown, the annular flange 2b defines at its inner periphery an opening (no numeral) whose diameter $d_2$ is smaller than the diameter $d_1$ of the engaging section 6, of the supporting and damping structure so as to have such a radial bent length h that the engaging section 6 cannot come out of the housing 2 upon leftward relative movement in FIG. 7.

Figure 8:
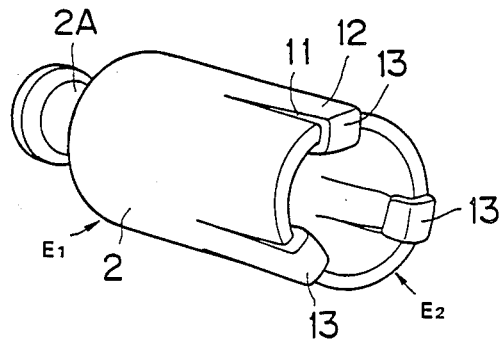
FIG. 8 is a perspective view of an essential part of a sixth embodiment of the accelerator cable arrangement in accordance with the present invention.

FIG. 8 illustrates a sixth embodiment of the accelerator cable arrangement in accordance with the present invention. In this embodiment, cuts 11 are formed in the end section $E_2$ of the housing 2 and axially extend toward the end section $E_1$ of the housing 2, in which adjacent two cuts 11 define an elongate portion 12. The free end section of each elongate portion 12 is bent two times with right angles to form a bent section 13 which is projected radially inwardly. It is preferable that at least two bent sections 13 are formed radially along the periphery of the end section $E_2$ of the housing 2. It will be understood that the bent sections 13 prevents the engaging section 6 from coming out of the housing 2.

While the engaging section 6 and the housing 2 have been shown and described to have a circular cross-section in all the embodiments, it will be appreciated that they may have other cross-sections such as rectangular cross-sections.

We claim:

1. An accelerator cable connecting device for an accelerator pedal connected to a pedal lever, said accelerator cable connecting device comprising:
   a housing securely connected at a first end section with the pedal lever, said housing being movable in a given direction upon depression of the accelerator pedal and having means defining a cylindrical inner wall;
   an accelerator cable,
   a supporting and damping structure movably disposed inside said housing and connected to transmit movement of said housing in the given direction to said accelerator cable, said supporting and damping structure including elastomeric means for elastically supporting said structure relative to said housing and for absorbing vibrations transmitted through said accelerator cable via said housing to said pedal; and
   said accelerator cable having a first end section passing through said housing first end section and disposed inside said housing, said accelerator cable first end section being securely connected to said supporting and damping structure, said accelerator cable having a second end section connected to an engine to accelerate the engine, and
   said housing defining an inner surface below said supporting and damping structure so that said structure is movable within said housing with a slight play whereby upon release of the accelerator pedal the supporting and damping structure is supported by said housing and prevented from hanging down by its own weight and contacting any adjacent members.

2. An accelerator cable connecting device as claimed in claim 1, wherein said supporting and damping structure includes an engaging section disposed inside said housing and secured to said accelerator cable first end section and an elastomeric section disposed inside said housing and located between said housing first end section and said engaging section.

3. An accelerator cable connecting device as claimed in claim 2, wherein said engaging section has a weight not less than 40 g.

4. An accelerator cable connecting device as claimed in claim 2, wherein said elastomeric section is formed with a through-hole through which said accelerator cable passes.

5. An accelerator cable connecting device as claimed in claim 4, further comprising stop means for restricting movement of said engaging section in an axial direction of said housing.

6. An accelerator cable connecting device as claimed in claim 5, wherein said stop means includes a stop member rigidly connected to a second end section of said housing and so located that said engaging section is strikable against said stop member upon movement in the axial direction of said housing.

7. An accelerator cable connecting device as claimed in claim 6, wherein said stop member is an annular flange integral with said housing second end section, said annular flange being coaxial with said housing.

8. An accelerator cable connecting device as claimed in claim 7, wherein said engaging section has a circular cross-section and an inner diameter of said annular flange is smaller than a diameter of said engaging section.

9. An accelerator cable connecting device as claimed in claim 6, said stop member comprising a wall integral with said housing second end section to completely close said housing second end section.

10. An accelerator cable connecting device as claimed in claim 2, said housing including a cylindrical projection securely connected to said housing first end section, said cylindrical projection being in direct contact with said pedal lever and formed with a through-hole for said accelerator cable.

11. An accelerator cable connecting device as claimed in claim 10, wherein said cylindrical projection is integral with said housing first end section.

12. An accelerator cable connecting device as claimed in claim 10, wherein said cylindrical projection forms part of a cylindrical member and has a section disposed inside said housing, wherein said elastomeric section is interposed between said section and said engaging member.

13. An accelerator cable connecting device as claimed in claim 2, wherein said engaging section is made of metal.

14. An accelerator cable connecting device as claimed in claim 1, wherein said supporting and damping structure is made of an elastomeric material and directly contactable with an inner surface of said housing first end section.

15. An accelerator cable connecting device as claimed in claim 1, wherein an axis of said housing is perpendicular to the upper end section of the pedal lever.

* * * * *